United States Patent Office 3,627,540
Patented Dec. 14, 1971

3,627,540
FLAVORING PROCESSES AND PRODUCTS
Ira Katz, Elberon, Christopher Giacino, Monmouth Beach, Louis J. Strasburger, Elizabeth, and Manfred H. Vock, West Orange, N.J., assignors to International Flavors & Fragrances Inc., New York, N.Y.
No Drawing. Filed Oct. 14, 1969, Ser. No. 866,400
Int. Cl. A23l 1/26
U.S. Cl. 99—140 R          10 Claims

ABSTRACT OF THE DISCLOSURE

Process for imparting a seafood flavor to foodstuffs comprising adding thereto a small amount of 2,4-pentadienal and, if desired, of an oxazoline; as well as flavoring compositions and flavor-enhancing compositions containing such pentadienal and optional oxazoline, and the foodstuffs so obtained.

BACKGROUND OF THE INVENTION

This invention relates to flavoring foodstuffs, to compositions for flavoring foodstuffs, and to the products so obtained.

Much attention has been devoted to improving the flavor of foodstuffs, and particularly the flavors of meat products, fruits, and confectionery. There is also a need to provide compositions and processes for improving the flavors of seafood, or for providing savory seafood flavors to foods containing no seafood or to seafood products having only a low level of flavor.

THE INVENTION

The present invention relates to the flavoring of esculent materials and generally to improving their organoleptic properties. Briefly, the present invention comprises adding to a foodstuff a small amount of 2,4-pentadienal effective to improve the flavor of such foodstuff, more particularly by imparting a seafood flavor to said foodstuff. In certain aspects of the present invention it is also contemplated that an oxazoline will be added together with the pentadienal. The invention also relates to such flavoring and flavor-enhancing compositions and to such compositions and to foodstuffs prepared according to the present disclosure.

The quantity of pentadienal utilized in the practice of this invention can be varied to provide a wide range of seafood-type flavors. As used herein, seafood-like flavors will be understood to mean flavors associated with marine animals including crustaceans such as shrimp, lobster, and the like; mollusks such as oysters, clams, and the like; and particularly fish including smoked fish, dried fish, salted fish, and the like.

Thus, at the level of 50 parts per billion, the pentadienal begins to impart a very light, almost indefinable, sensation in aqueous solution. As the level is increased to one part per million (p.p.m.) a definite pleasant salt water fish-like character is imparted to an aqueous solution. As the level reaches 2 p.p.m., a definite, good characteristic anchovy flavor is obtained and this flavor persists up through levels of 10 p.p.m. and beyond, where the substance leaves a light, lingering aftertaste. Thus, amounts of the thiazo derivative up to 50 p.p.m. can be used, so the desirable range is from 0.05 to 50 p.p.m. In many aspects of the present invention amounts of from one to ten p.p.m. are preferred. All parts, proportions, percentages and ratios herein are by weight unless otherwise indicated.

The pentadienal can be added in pure form or in reaction mixtures containing it. The pentadienal can readily be prepared by a number of reaction routes, and is preferably purified to contain at least about 80% of the pentadienal. It will be understood by those skilled in the art that, regardless of the purity of the pentadienal used, it should contain no noxious or noisome components which would interfere with the flavor conferred on foodstuffs or on its safety for use in edible materials.

It is contemplated herein that foodstuffs flavored according to this invention include both solid and liquid preparation for oral consumption by human beings and by animals, particularly warm-blooded domestic animals such as are used for pets or raised for consumption.

The seafood flavor characteristic of the pentadienal can further be varied by including one or more cyclic oxazo compounds, particularly $\Delta^3$-oxazolines having the formula

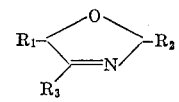

wherein $R_1$, $R_2$ and $R_3$ are hydrogen, alkyl, or alkylene and can be the same or different. It is preferred in certain embodiments of the present invention to use lower alkyl derivatives of oxazoline, preferably those having up to about three carbon atoms in the alkyl group or groups. A preferred oxazoline in certain embodiments of the invention is 2,4,5-trimethyl-$\Delta^3$-oxazoline.

The amount of oxazoline can be varied over a range to provide a variety of shadings of seafood flavor notes. The quantity of oxazoline utilized varies from about an amount equal to the quantity of pentadienal up to ten or more times the quantity of pentadienal. As components for use in the processes and compositions of this invention, oxazolines provide a flavor redolent of cooked fresh seafood, particularly fresh fish.

Accordingly, the present invention also provides compositions for providing seafood flavors to foodstuffs including comestible liquids such as broths, chowders, bouillabaisse, bisques, and other liquids or beverages. The Pentadienal, and optionally, oxazoline, can be used as complete flavors, as components of flavoring compositions, and to enhance, vary, alter, modify, or improve the flavors of foodstuffs alone or in combination with other ingredients. In some circumstances when only a single flavor impression is desired, the aldehyde can be added alone and will provide substantially the entire flavor and aroma impression to a product.

More generally, the penetadienal according to this invention can be admixed with other materials to provide a flavoring composition or a flavor-enhancing composition. As used herein, a flavoring composition is one which provides substantially the entire flavor and aroma impression to a foodstuff, and a flavor-enhancing composition is one suited for addition to a natural or other product to provide only the flavor and aroma notes lacking in the original foodstuff. An example of this latter use would be addition of a flavor-enhancing composition to a fish chowder to give a flavor impression more like that of freshly made chowder by supplying nuances which have been destroyed or altered in processing.

Thus, the compound or compounds according to this invention can be combined with adjuvant ingredients as necessary to impart special characteristics. Such other ingredients include vehicles such as water, ethanol, propylene glycol, glycerol, glyceride oils, and the like, and carriers such as gum arabic, tragacanth, and the like to provide a base for a spray-dried flavor composition. They also include thickeners such as alginates, carrageenen, and the like to impart a heavier body to gravies and similar products; condiments and spices such as salt, pepper, allspice, basil, bay leaves, capsicum extract, cloves, eugenol, garlic oil, onion oil, oregano extract, pyroligneous acid, sage oil, saffron, sassafras leaves, sodium citrate, thyme, hydrolyzed vegetable protein, and the like; encapsulating agents so that the flavor composition can be coacervated to provide micro-encapsulated products; coloring agents such as the approved food, drug and cosmetic colors, vegetable colors, caramel, and the like; other flavoring materials as required to provide the desired flavor impression; flavor intensifiers such as monosodium glutamate and the various nucleotides; freshness preservers and antioxidants such as ascorbic acid, propyl gallate, sorbates, butylated hydroxyanisole, and butylated hydroxytoluene; and the like. It will be appreciated that only some of these materials need be added to obtain a flavoring or flavor-enhancing composition.

When used as components of flavoring compositions and flavor-enhancing compositions, it is generally desirable that the pentadienal comprise from 0.05 to about 50% of the total composition, although greater or lesser amounts can be used in some embodiments. The amounts used in a particular composition will vary according to the factors as indicated above.

The pentadienal and optional oxazoline according to this invention can be incorporated into foods such as soups and soup mixes, casserole dishes, canned and frozen vegetables, animal and pet foods and other veterinary products, sauces, gravies, broths, chowders, stews, simulated seafood products, dietetic products, spreads and dips, and the like. It is generally preferred that from about 0.5 to about 25 p.p.m. of the pentadienal according to the present invention be comprised in the total foodstuff to be flavored. Amounts somewhat less or somewhat greater than this can be utilized, dependent upon the particular reaction product, the foodstuff to be improved, personal preferences, and local tastes, and the like. Likewise, the amount of oxazoline ranges from an amount equal to the pentadienal to 10 times as much.

It will accordingly be appreciated that the present invention also provides a process for altering, improving, fortifying, supplying, or enhancing the flavors of a wide variety of foodstuffs.

The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of 2,4-pentadienal

One thousand grams of a commercially available 50% solution of 1-methoxy-1-buten-3-yne in aqueous methanol is dried over magnesium sulfate, with 200 cc. benzene added to facilitate removal of water. The dried material is then distilled at atmoshperic pressure on a 1-foot Goodloe column at a 9:1 reflux ratio to remove the water and methanol. The vessel is then cooled and a vacuum applied to distill the liquid at a pressure of 100 mg. Hg with a vapor temperature of 66–68° C. and a liquid temperature of 81–129° C. This procedure provides 370 g. of starting material.

A two-liter reaction flask fitted with a condenser, addition funnel, thermometer, stirring means, and heating mantle is charged with a mixture of 300 g. of potassium hydroxide in 800 ml. of methanol. With the flask contents at 45° C., 246 g. of methoxybutenyne is added to the flask, and 270 g. of paraformaldehyde dissolved in a minimum quantity of methanol is added dropwise with stirring during a three-hour period. The reaction is then continued at 45° C. while 31 g. of paragormaldehyde is added.

After raising the reaction temperature to 60° C. and adding 50 g. of paraformaldehyde to complete the reaction, the mixture is cooled and neutralized to pH 7 with formic acid. The methanol is removed under vacuum until potassium formate begins to precipitate. The organic layer and aqueous layer are then separated, the aqueous layer is extracted with ether, the extract is combined with the organic layer, the combined material is dried over magnesium sulfate, solvent is removed under vacuum, and the resulting product is distilled at 91–92° C. and 3.5 mm. Hg to give 84 g. of 1-methoxy-1-penten-e-yn-5-ol.

The foregoing alcohol (80 g.) is dissolved in 100 ml. of dry ethyl ether and added dropwise to a slurry of 40 g. of lithium aluminum hydride in 500 ml. of ether at room temperature under a dry nitrogen atmosphere. The reaction mixture begins to reflux, and the addition of the alcohol is completed in three hours. After stirring for an additional hour and standing overnight under nitrogen, the hydride is deactivated with ethyl acetate and then hydrolyzed with 110 g. of concentrated sulfuric acid diluted with one liter of ice-water.

The mixture is stirred for 45 minutes, the organic layer is separated and combined with an ether extract of the aqueous layer. The combined material is washed with a 10% aqueous sodium bicarbonate solution and then with a saturated sodium chloride solution, and dried over magnesium sulfate.

The solvent is removed under vacuum to obtain a crude material containing 20% pentadienal. The crude product is treated with 500 ml. of 10% sulfuric acid under a nitrogen atmosphere and then washed and dried as above. Sixteen grams of the material so obtained is distilled on a spinning band column at 55 mm. Hg and a reflux ratio of 21:1. The fraction boiling at 50–51° C. is collected to obtain a product containing 2,4-pentadienal having the formula $CH_2\!\!=\!\!CH\!-\!CH\!\!=\!\!CH\!-\!CHO$.

Evaluation of pentadienal

Aqueous solutions of the pentadienal so obtained are prepared with the concentrations as indicated in the following table:

TABLE I

| Concentration (p.p.m.): | Flavor evaluation |
|---|---|
| 0.05 | Threshold level; light burning sensation. |
| 0.2 | Light greasy, waxy character; somewhat onion-like. |
| 1.0 | Salt water-fish-like character; light spicy aftertaste. |
| 2.0 | Definite, characteristic anchovy. |
| 5.0 | Intense anchovy. |
| 10.0 | Same as 5 p.p.m., but with light lingering aftertaste. |

At the 2 p.p.m. level in water, the pentadienal confers a definite anchovy odor characteristic.

EXAMPLE II

Various levels of the 2,4-pentadienal are added to a commercial chicken broth product at the levels shown in the following table:

TABLE II

| Concentration (p.p.m.): | Flavor evaluation |
|---|---|
| 1.0 | Onion-like aftertaste. |
| 3.0 | A flavor character of white chicken meat is added; chicken flavor much fuller. |
| 6.0 | Fish soup character added. |
| 10.0 | Chicken broth character changing to fish soup character. |

EXAMPLE III

A fish flavor is prepared by admixing 5 mg. of 2,4-pentadienal and 3 g. of cade oil with sufficient cod liver oil to make up a kilogram of material.

Ten grams of this oil is admixed with 10 grams of vinegar and applied to a greens salad containing sliced radishes and pieces of fresh tomato. The salad so obtained has an excellent anchovy flavor nuance.

EXAMPLE IV

A fish flavor is prepared by admixing 3 g. of cade oil, 20 mg. of 2,4,5-trimethyl-$\Delta^3$-oxazoline, 3 mg. of 2,4-pentadienal, and sufficient cod liver oil to make 1 kg. of finished oil.

EXAMPLE V

The fish flavor composition of Example IV in the amount of 0.9 cc. is added to 7.3 g. of a soup base consisting of:

| Ingredient: | Quantity (parts) |
| --- | --- |
| Fine ground sodium chloride | 35.62 |
| Hydrolyzed vegetable protein (Nestle 4 BE) | 27.40 |
| Monosodium glutamate | 17.81 |
| Sucrose | 10.96 |
| Beef fat | 5.48 |
| Sethness caramel color (powder B & C) | 2.73 |

The resulting mixture is added to 12 ounces of boiling water to create a soup having an excellent fish chowder flavor.

EXAMPLE VI

One gram of the fish flavor of Example IV is emulsified in a solution containing the following ingredients:

| Ingredient: | Amount (g.) |
| --- | --- |
| Gum arabic | 100 |
| Water | 300 |
| Butylated hydroxyanisol (20% solution in ethanol) | 0.51 |

The resulting emulsion is spray-dried in a Bowen Lab Model spray-drier with inlet temperature of 500° F., and outlet temperature of 200° F. Twelve grams of this spray-dried material is mixed with 29.2 grams of the soup base set forth in Example IV. The resulting mixture is then added to 12 ounces of boiling water, and an excellent fish chowder is obtained.

I claim:

1. A process for treating a foodstuff which comprises adding thereto a small amount of 2,4-pentadienal sufficient to alter the flavor of said foodstuff.

2. A process according to claim 1 wherein sufficient pentadienal is added to provide from 0.05 to 50 parts per million of the aldehyde in the foodstuff.

3. A process according to claim 1 wherein sufficient pentadienal is added to provide from one to ten parts per million in the foodstuff.

4. A foodstuff obtained according to the process of claim 1.

5. A process according to claim 1 wherein there is additionally added a small amount of an oxazoline to alter the flavor of the foodstuff, said oxazoline having the formula

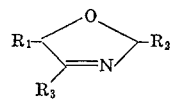

wherein $R_1$, $R_2$, and $R_3$ are the same or different and represent hydrogen or lower alkyl having up to three carbon atoms.

6. A process according to claim 5 wherein the oxazoline is present in from an amount equal to the amount of pentadienal up to ten times the amount of pentadienal.

7. A process according to claim 5, wherein $R_1$, $R_2$, and $R_3$ are methyl.

8. A food flavoring composition comprising from 0.05 to 50 percent of 2,4-pentadienal and at least one flavoring adjuvant other than alcohol.

9. A food flavoring composition according to claim 8 additionally containing an amount of oxazoline at least equal to the amount of pentadienal, said oxazoline having the formula

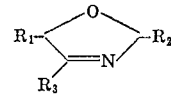

wherein $R_1$, $R_2$, and $R_3$ are the same or different and represent hydrogen or lower alkyl having up to three carbon atoms.

10. A food flavoring composition according to claim 9 wherein $R_1$, $R_2$, and $R_3$ are methyl.

References Cited

"Handbook of Chemistry and Physics," R. C. Weast, ed., 47th edition, C–74, C–448, Chem. Rubber Co., Cleveland, Ohio, 1966.

MORRIS O. WOLK, Primary Examiner

S. MARANTZ, Assistant Examiner

U.S. Cl. X.R.

260—307 F, 602